US010395678B1

(12) United States Patent
Rajauria et al.

(10) Patent No.: US 10,395,678 B1
(45) Date of Patent: Aug. 27, 2019

(54) METHOD AND SYSTEM FOR DETERMINING SLIDER-DISK CONTACT IN A MAGNETIC RECORDING DISK DRIVE WITH DUAL FLY-HEIGHT ACTUATORS

(71) Applicant: Western Digital Technologies, Inc., San Jose, CA (US)

(72) Inventors: Sukumar Rajauria, San Jose, CA (US); Erhard Schreck, San Jose, CA (US); Robert Smith, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/212,130

(22) Filed: Dec. 6, 2018

(51) Int. Cl.
*G11B 5/54* (2006.01)
*G11B 5/48* (2006.01)
*G11B 5/012* (2006.01)
*G11B 5/00* (2006.01)

(52) U.S. Cl.
CPC .......... *G11B 5/4826* (2013.01); *G11B 5/012* (2013.01); *G11B 2005/0021* (2013.01)

(58) Field of Classification Search
CPC ... G11B 27/36; G11B 2005/0021; G11B 5/58; G11B 5/54; G11B 5/5536; G11B 20/20
USPC ........................................ 360/31, 59, 75, 76
See application file for complete search history.

(56) References Cited

U.S. PATENT DOCUMENTS

| 8,149,541 | B2 | 4/2012 | Baumgart et al. |
| 8,599,506 | B2 | 12/2013 | Contreras |
| 8,634,167 | B2 | 1/2014 | Wen-Chien et al. |
| 9,047,926 | B2 | 6/2015 | Contreras et al. |
| 9,070,397 | B1 | 6/2015 | Ito et al. |
| 9,117,474 | B1 | 8/2015 | Contreras et al. |
| 9,564,163 | B2 | 2/2017 | Contreras et al. |
| 9,595,280 | B2 | 3/2017 | Canchi et al. |
| 9,595,281 | B2 | 3/2017 | Rajauria et al. |
| 9,601,140 | B1 | 3/2017 | Rajauria |
| 9,659,584 | B2 | 5/2017 | Liu |
| 2013/0114161 | A1* | 5/2013 | Yuan ................ G11B 27/36 360/75 |

OTHER PUBLICATIONS

HGST White Paper, "Thermal Fly-height Control (TFC) Technology in HGST Hard Disk Drives" (Nov. 2007) https://www.hgst.com/sites/default/files/resources/TFC_whitepaper041807.pdf.

(Continued)

*Primary Examiner* — Nabil Z Hindi
(74) *Attorney, Agent, or Firm* — Thomas R. Berthold

(57) ABSTRACT

A method and system for determining slider-disk contact in a hard-disk drive (HDD) that has dual independent heaters for thermal fly-height control, and dual embedded contact sensors, includes dithering power to the two heaters at different frequencies. The HDD has the two contact sensors electrically connected to provide a single combined output signal in response to the dithering. The single combined output signal is analyzed to detect two signals at the two different frequencies. When either detected signal exceeds a predetermined touchdown threshold value, the values of heater power for the two heaters are recorded, indicating that that combination of heater power values corresponds to slider-disk contact.

14 Claims, 7 Drawing Sheets

(56) References Cited

OTHER PUBLICATIONS

Xiong et al. "Spacing control in Heat assisted Magnetic Recording", The 29th Magnetic Recording Conference (TMRC), UC San Diego, Aug. 8-10, 2018 http://tmrc2018.ucsd.edu/Archive/B1.pdf.
Shaomin et al., "Flying Height Modulation for a Dual Thermal Protrusion Slider in Heat Assisted Magnetic Recording (HAMR)", IEEE Transactions on Magnetics (vol. 49, Issue: 10, Oct. 2013) p. 5222-5226.

* cited by examiner

METHOD AND SYSTEM FOR DETERMINING SLIDER-DISK CONTACT IN A MAGNETIC RECORDING DISK DRIVE WITH DUAL FLY-HEIGHT ACTUATORS

BACKGROUND

Field of the Invention

This invention relates to magnetic recording disk drives that have a fly-height actuator for controlling the spacing between the read/write head and the disk, and more particularly to a system and method for determining contact of the head carrier with the disk in such disk drives.

Description of the Related Art

Magnetic recording hard disk drives use a read/write transducer or head mounted on a head carrier for reading and/or writing data to the disk. The head carrier is typically a gas-bearing slider attached to an actuator arm by a suspension and positioned very close to the disk surface by the suspension. There is typically a stack of disks in the disk drive with a slider-suspension assembly associated with each disk surface in the stack.

The separation or spacing between the slider and the disk surface is called the fly height. The slider has a disk-facing gas-bearing surface (GBS) that causes the slider to ride on a cushion or bearing of gas, typically air or helium, generated by rotation of the disk. The slider is attached to a flexure on the suspension and the suspension includes a load beam that applies a load force to the slider to counteract the gas-bearing force while permitting the slider to "pitch" and "roll". The flying dynamics of the slider and thus the fly height are influenced by factors such as the rotation speed of the disk, the aerodynamic shape of the slider's GBS, the load force applied to the slider by the suspension, and the pitch and roll torques applied to the slider by the suspension.

Disk drives with thermal fly-height control (TFC) of the read/write heads have been proposed. One type of TFC uses an electrically-resistive heater located on the slider near the head. When current is applied to the heater, the heater expands and causes the head to expand and thus move closer to the disk surface. The head can be adjusted to different heights, depending on whether the drive is reading or writing. Also, the heater can maintain the head at the optimal fly-height even in the presence of the above-described factors, which would otherwise cause changes in the fly-height. The TFC heater must be accurately calibrated so that the head-disk spacing can be controlled. The calibration requires that the value of heater power that results in onset of slider-disk contact or "touchdown" be known.

An embedded contact sensor (ECS), embedded in the slider near the read/write head, can be used to sense touchdown. The ECS comprises a metallic strip located at the slider GBS. The resistance of the ECS changes in response to temperature changes so the voltage across the ECS can be used to determine touchdown, when the slider temperature changes as it comes in close proximity to the disk.

SUMMARY

Embodiments of this invention relate to a hard-disk drive (HDD) that has dual independent heaters for thermal fly-height control, wherein one heater is associated with the reader or read head and the other heater is associated with the writer or write head, and dual embedded contact sensors. In such a HDD it is desirable to be able to independently control the two heaters, i.e., to be able to apply different power levels to each of the two heaters simultaneously. For example, during a write operation when writer heater power is being applied, it may be desirable to also apply some reader power to move the read sensor closer to the disk to read servo information.

It is thus necessary to determine which combinations of the two independent heater power values, or ratios of the two heater power values, will result in touchdown at the desired location. In embodiments of this invention ECS1 (associated with the reader) and ECS 2 (associated with the writer) are connected in parallel to minimize the number of electrical contact pads required on the slider. Because ECS1 and ECS2 are connected in parallel so as to provide a single combined output signal, it is not possible to determine the signal output value of each ECS when both heaters are operating simultaneously.

Embodiments of this invention relate to a method and system for calibrating the two heaters by determining touchdown for various combinations of heater power values in a HDD that has ECS1 and ECS2 connected in parallel so as to provide a single combined output signal. The TFC heaters must be accurately calibrated so that the slider-disk spacing can be controlled. The calibration requires that the value of heater power that results in onset of touchdown for various combinations of TFC1 and TFC2 heater power values be known.

For a complete understanding of the nature and advantages of the invention, reference should be made to the following detailed description taken together with the accompanying figures.

DETAILED DESCRIPTION

Figure 1:
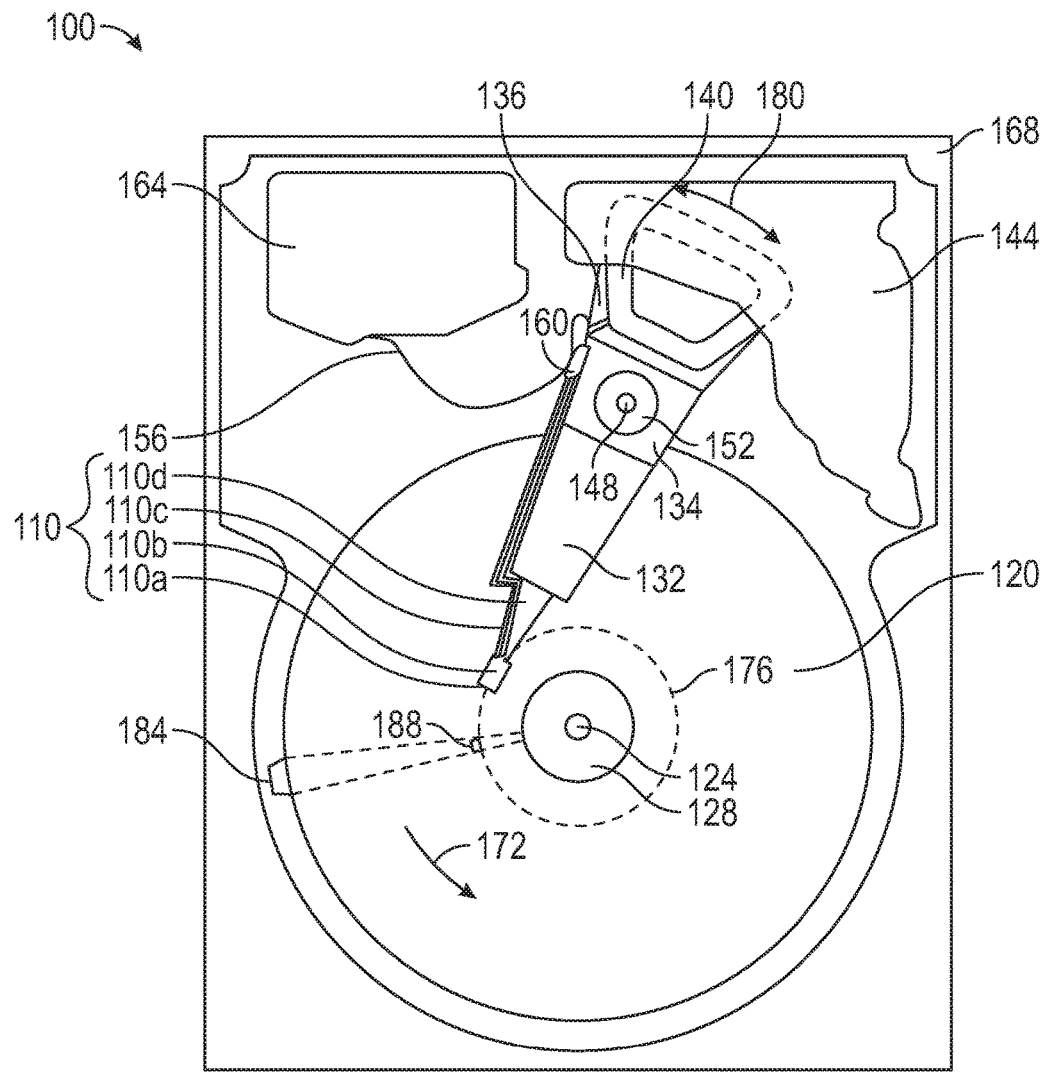
FIG. 1 is a schematic block diagram of a magnetic recording hard disk drive (HDD) according to embodiments of the invention.

A plan view illustrating an HDD 100 according to embodiments of the invention is shown in FIG. 1 to illustrate an exemplary operating environment.

The HDD 100 includes a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic recording medium 120 rotatably mounted on a spindle 124 and a drive motor (not visible) attached to the spindle 124 for rotating the medium 120. The head 110a includes a write head or element and a read head or element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of gas that acts as an gas-bearing on which the gas-bearing surface (GBS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics (AE) module, a data channel, a motor driver, a servo processor, and other digital processors and associated memory. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

Figure 2:
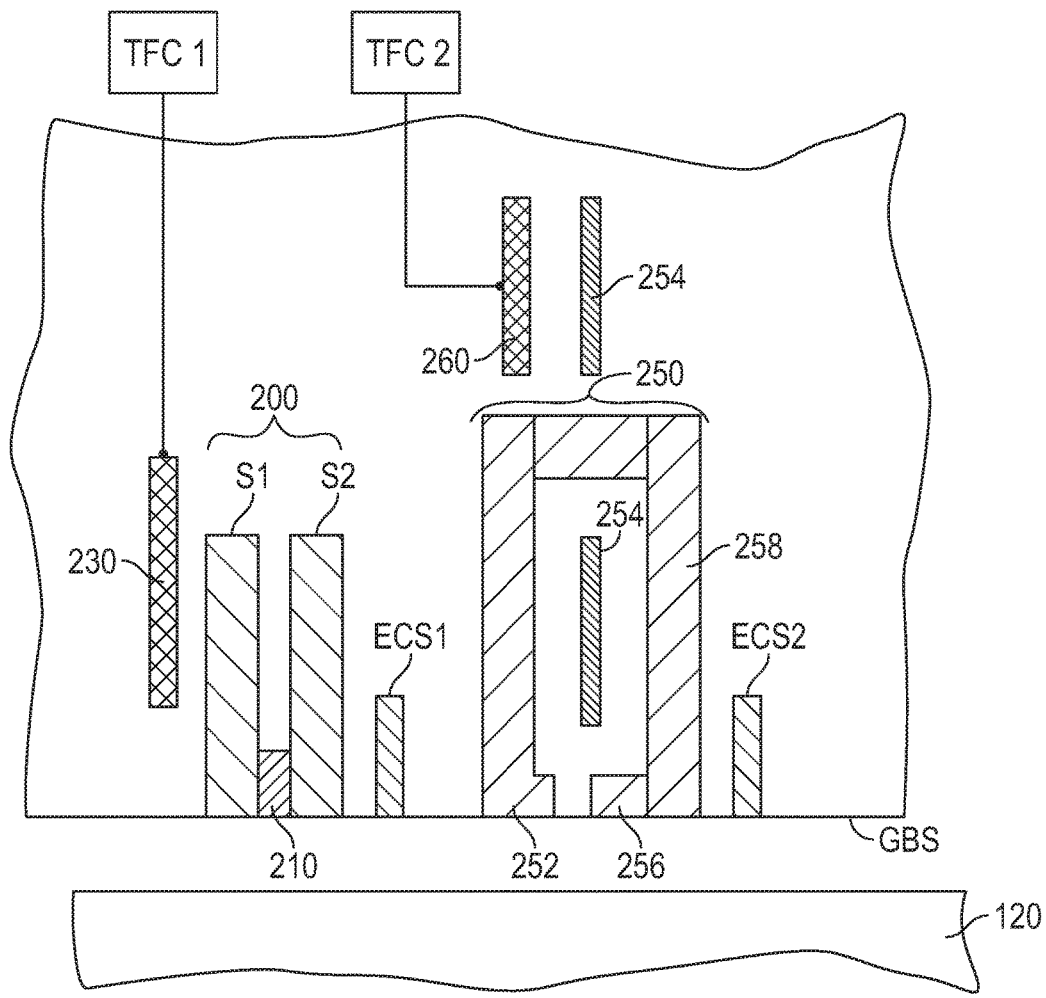
FIG. 2 is a block diagram illustrating a cross-sectional view of the slider with dual independent heaters and dual associated embedded contact sensors.

FIG. 2 is a block diagram illustrating a cross-sectional view of the read and write heads on the head slider with dual independent heaters and dual associated embedded contact sensors. A thermal embedded contact sensor (ECS) functions as a variable resistor in a circuit that provides a varying voltage output as changes in head-disk spacing cause changes in heating of the sensor. A thermal ECS is described in U.S. Pat. No. 8,618,793 B2 and U.S. Pat. No. 8,335,053 B2, both assigned to the same assignee as this application.

Reader 200 comprises a read sensor 210, typically a magnetoresistive sensor, located between two soft magnetic shields S1 and S2. Heater 230 associated with reader 200 is controlled by a first thermal fly-height control (TFC1) device. By applying current to the heater 230, the surrounding slider material is caused to expand in response to the heat, which causes a bulge in the slider toward the disk 120 thus reducing the flying height. Particularly during read operations, the heater 230 causes the read sensor 210 to be closer to the disk 120 to increase the strength of the readback signal read from the recording medium. A first embedded contact sensor (ECS1) is a metallic strip located at the GBS near reader 200. The resistance of ECS1 changes in response to temperature changes and can be used to detect head-disk contact, when the slider temperature suddenly increases due to frictional heating with the disk 120.

Writer 250 comprises a main pole 252, a writer coil 254, a trailing magnetic shield 256, and a return pole 258. Main pole 252 is exposed at the GBS and faces disk 120. Electric current flowing through the coil 254 produces a magnetic field that emits from the tip of main pole 252 and forms recording bits by reversing the magnetization of magnetic regions on the disk 120. A return pole 258 is positioned for providing means for the magnetic flux to return from disk 120 to the writer structure to complete the magnetic circuit. The magnetic trailing shield 256 is positioned between the main pole 252 and the return pole 258 for assisting with focusing the magnetic flux emitting from main pole 252. Like reader 200, writer 250 has a heater 260, controlled by a second thermal fly-height control (TFC2) device, and an associated second embedded contact sensor (ECS2). During write operations, the heater 260 causes the main pole 252 and trailing shield 256 to be closer to the disk 120 to thereby enable the written magnetic bits to be placed closer together.

Figure 3A:
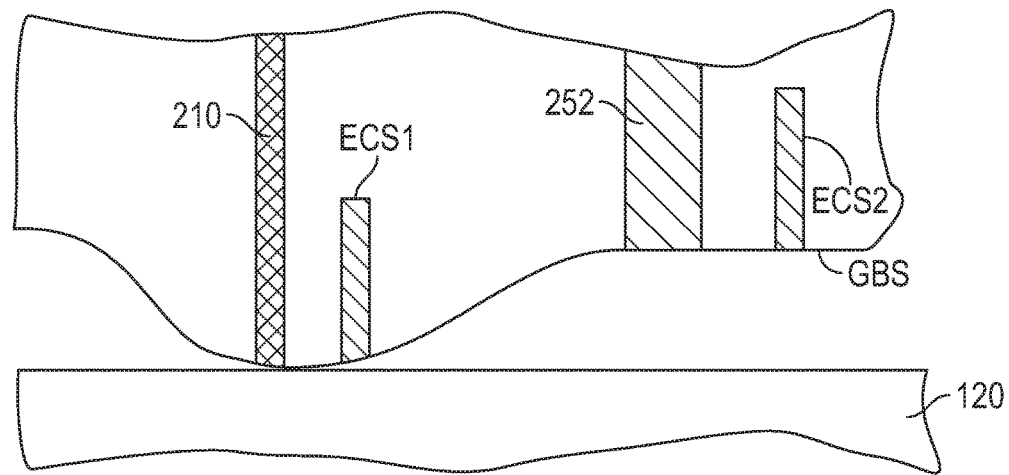
FIG. 3A is a schematic cross-section of a portion of the slider illustrating protrusion of the reader toward the disk when the reader heater has applied power sufficient to cause touchdown of the reader, with no power being applied to the writer heater.
Figure 3B:
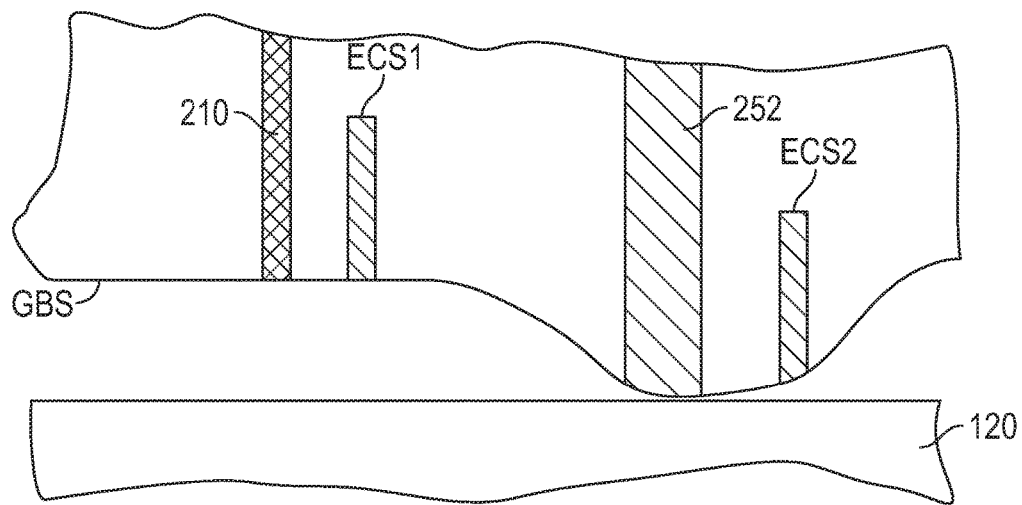
FIG. 3B is a schematic cross-section of a portion of the slider illustrating protrusion of the writer toward the disk when the writer heater has applied power sufficient to cause touchdown of the writer, with no power being applied to the reader heater.

FIG. 3A is a schematic cross-section of a portion of the slider illustrating protrusion of the read sensor 210 toward disk 120 when TFC1 has applied power to the reader heater 230 (FIG. 2) sufficient to cause touchdown, with no power being applied by TFC2 to cause the write main pole 252 to protrude. ECS1 would experience the change in output signal as it is in contact with disk 120 and its output signal would be at a maximum, representing touchdown. The known heater power value applied by TFC1 when ECS1 is at touchdown can be correlated with the output signal because there is no power being applied to the writer heater. In a similar illustration, FIG. 3B is a schematic cross-section of a portion of the slider illustrating protrusion of the write main pole 252 toward disk 120 when TFC2 has applied power to the writer heater 260 (FIG. 2) sufficient to cause touchdown, with no power being applied by TFC1 to cause read sensor 210 to protrude. ECS2 would experience the change in output signal as it is in contact with disk 120 and its output signal would be at a maximum, representing touchdown. The known heater power value applied by TFC2 when ECS2 is at touchdown can be correlated with the output signal because there is no power being applied to the reader heater.

Figure 4:
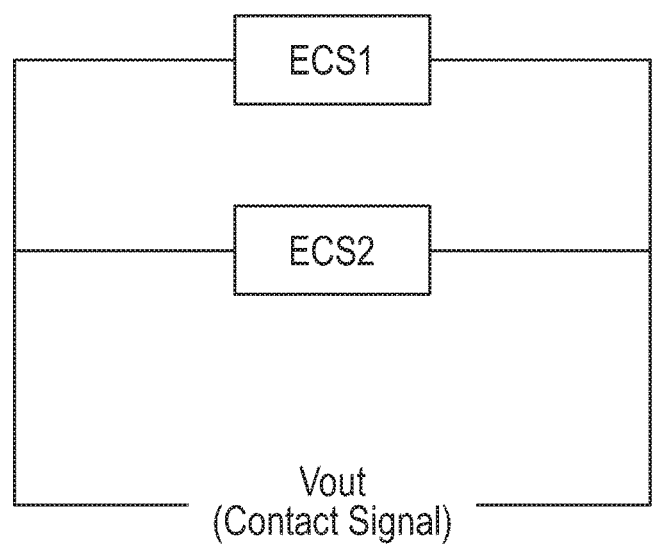
FIG. 4 is a schematic showing the embedded contact sensors (ECS1 and ECS 2) being connected in parallel for providing a combined output signal.

In embodiments of this invention ECS1 and ECS 2 are connected in parallel, as shown in FIG. 4, to minimize the number of electrical contact pads required on the head slider. Because ECS1 and ECS2 are connected in parallel so as to provide a single output signal ($V_{out}$), it is not possible to determine the signal output value of each ECS when both heaters are operating simultaneously.

Figure 5:
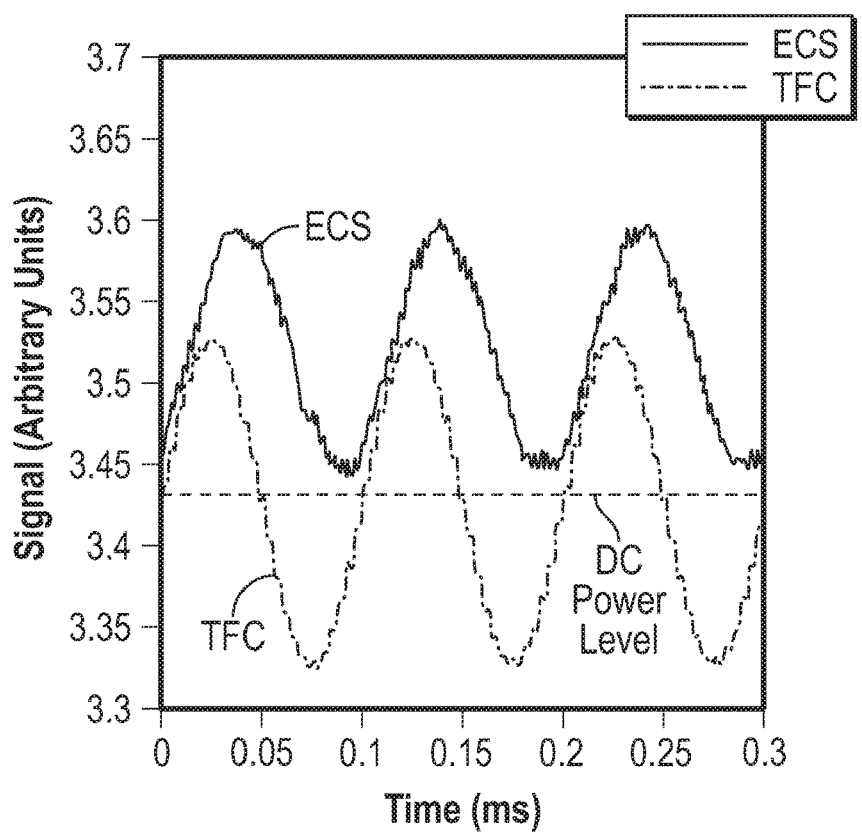
FIG. 5 is a schematic illustrating an example of dithered heater power and a corresponding ECS output signal.

Embodiments of this invention relate to a method and system for calibrating the two heaters by determining touchdown for various combinations of heater power values in a HDD that has ECS1 and ECS2 connected in parallel so as to provide a single combined output signal. In embodiments of the method of the invention, power to each TFC heater is dithered, meaning that the power is oscillated about a DC value. FIG. 5 illustrates an example of dithering. In this example for one ECS, the TFC power is oscillated at a frequency of 10 kHz about a DC power value with a predetermined amplitude. FIG. 5 shows the ECS signal in response to the dithering. The typical TFC heater is capable of applying power up to about 200 mW. The dithering is done at a predetermined amplitude, for example between about 1 and 50 mW, about a DC power value.

In embodiments of the method of this invention, the TFC1 heater power and TFC2 heater power are dithered at different frequencies, and the output signal from the combined ECS1 and ECS2 is analyzed to detect signals at the two frequencies, ECS(f1) and ECS(f2). When either ECS(f1) or ECS(f2) signal exceeds a predetermined touchdown threshold value, the values of TFC1 and TFC2 power are recorded, indicating that this combination of heater power values corresponds to touchdown. The touchdown threshold value may be determined by increasing DC power to the heater and monitoring the ECS signal. Typically the ECS signal will decrease as the ECS approaches the disk due to cooling as heat is transferred to the disk, but then will rather rapidly increase due to frictional heating from the disk. Thus the touchdown threshold value for the ECS signal may be the value when the ECS signal has zero slope.

Figure 6:
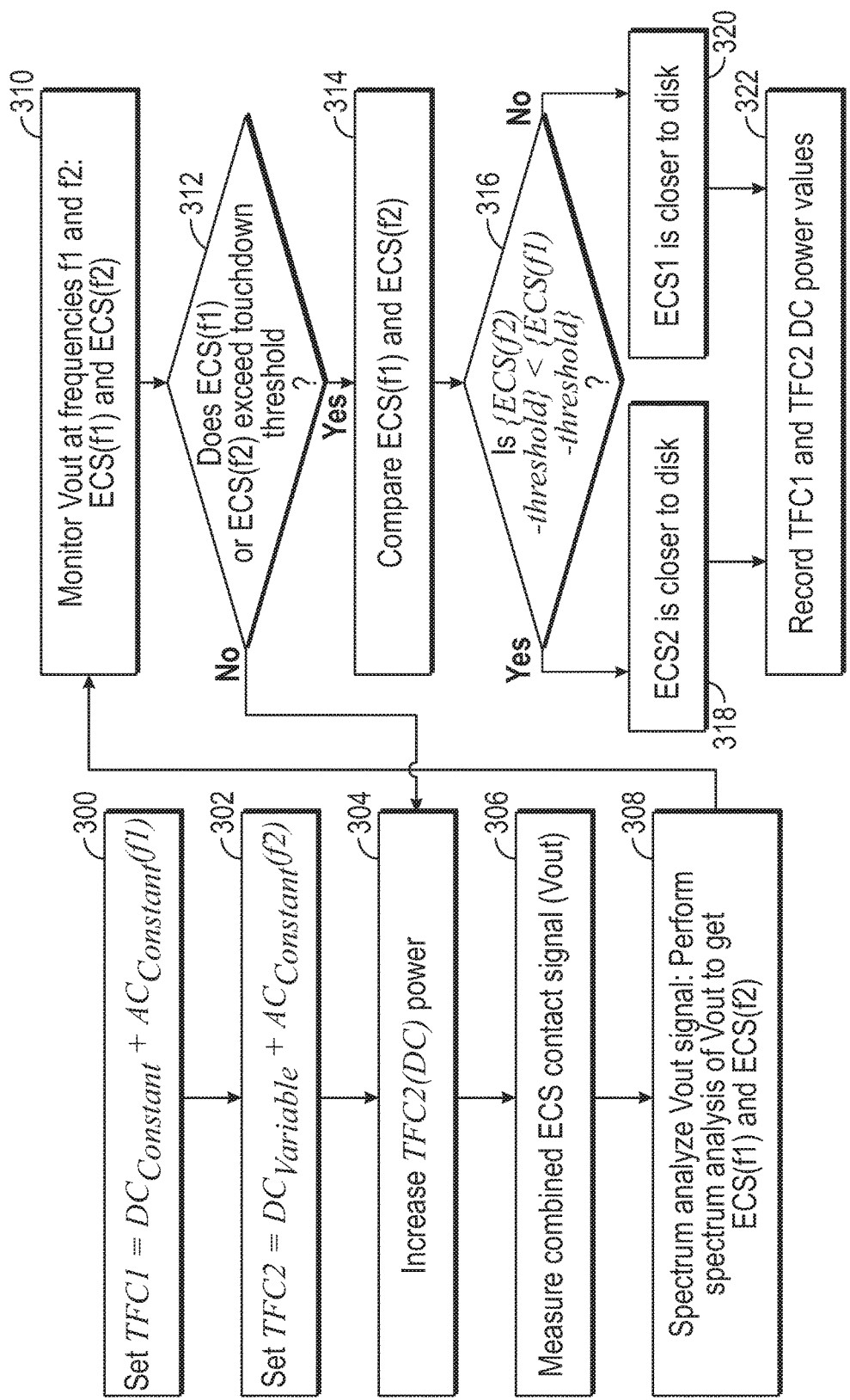
FIG. 6 is a flow chart for an embodiment of the method.
Figure 7A:
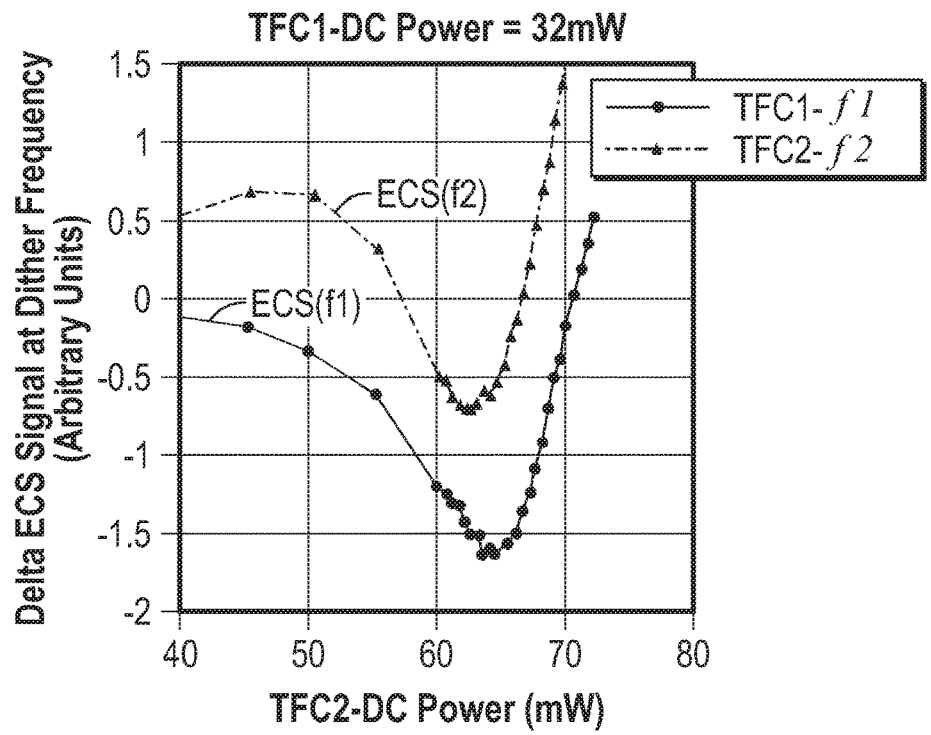
FIG. 7A is a graph of the two signals at the two frequencies, ECS(f1) and ECS(f2), from the combined output signal for the example with the heater power settings described in the flow chart of FIG. 6.

FIG. 6 is a flow chart for an embodiment of the method. In block 300 TFC1 is set at a predetermined DC value with a dither at a predetermined dither frequency f1. In block 302 TFC2 is set at an initial DC value (for example 40 mW) with a dither at a predetermined different dither frequency f2. Frequencies f1 and f2 can be between about 1 and 100 kHz. In block 304, the TFC2 DC power value is increased. In block 306 the combined output signal ($V_{out}$) of ECS1 and ECS2, which are connected in parallel, is measured. At block 308, $V_{out}$ is analyzed at frequencies f1 and f2 to provide two signals, ECS(f1) and ECS(f2). These two signals are monitored at block 310. FIG. 7A is a graph of the two ECS(f1) and ECS(f2) signals as a function of increasing TFC2 DC power. For example, assume $V_{out}$ is monitored at TFC2 DC power of 45 mW (TFC1 DC power at 32 mW). Then ECS(f1) would have an amplitude of about −0.1 units and ECS(f2) would have an amplitude of about 0.6 units. At block 312, if $V_{out}$ does not exceed a predetermined touchdown threshold (for example when the slope of $V_{out}$ is zero) then the TFC2 DC power is increased (block 304). This continues until $V_{out}$ exceeds the touchdown threshold, at which point the ECS(f1) and ECS(f2) signals are compared (block 314). At block 316, if the ECS(f2) value is closer to the touchdown threshold (ECS(f2)—threshold) than the ECS(f1) value, then this indicates that the ECS2 sensor is closer to the disk than the ECS1 sensor (block 318), while if the ECS(f1) value is closer to the touchdown threshold (ECS(f1)—threshold) than the ECS(f2) value then this indicates that the ECS1 sensor is closer to the disk than the ECS2 sensor (block 320). The TFC1 and TFC2 DC power values are then recorded (block 322). Referring to FIG. 7A, as TFC2 DC power increases, both ECS(f1) and ECS(f2) values slowly decrease to a minimum value. The values decrease due to cooling as the slider approaches the disk until the slider nears contact with the disk, when frictional heating causes the signals to increase. The minimum values thus represent touchdown. So at a TFC2 DC power of about 62 mW and a TFC1 DC power of 32 mW, the ECS(f2) value is approximately equal to the threshold (slope equals zero) so ECS2 is closer to the disk than ECS1 (i.e., the writer is closer to the disk than the reader), indicating those two power values correspond to the slider touchdown values. Also, in this example the minimum of the ECS(f1) signal also occurs close to the same TFC2 DC power (approximately 64 mW) so at these same two power values, both the reader and writer may be considered at or very near touchdown. The method of FIG. 6 may also be implemented by increasing the TFC1 DC power instead of the TFC2 DC power at block 304.

Figure 7B:
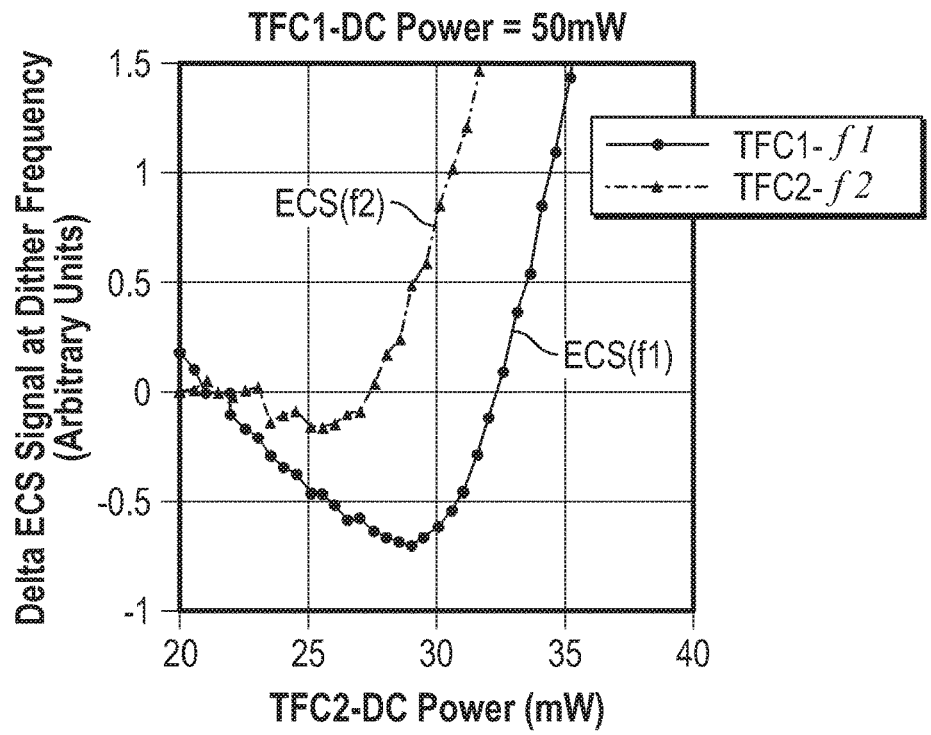
FIG. 7B is a graph of the two signals at the two frequencies, ECS(f1) and ECS(f2), for another example with heater power settings different from the example of FIG. 7A.

FIG. 7B is another example with different heater power values. TFC1 DC power is at 50 mW and dithered at f1 kHz. TFC2 is initially at 20 mW and dithered at f2 kHz. As TFC2 DC power increases, touchdown of the slider occurs at the minimum of the ECS(f2) signal at a TFC2 DC power of about 26 mW. So TFC1 and TFC2 DC power levels of 50 mW and 26 mW, respectively, correspond to another set of heater power levels that represent slider touchdown wherein the writer is closer to the disk than the reader.

Figure 8:
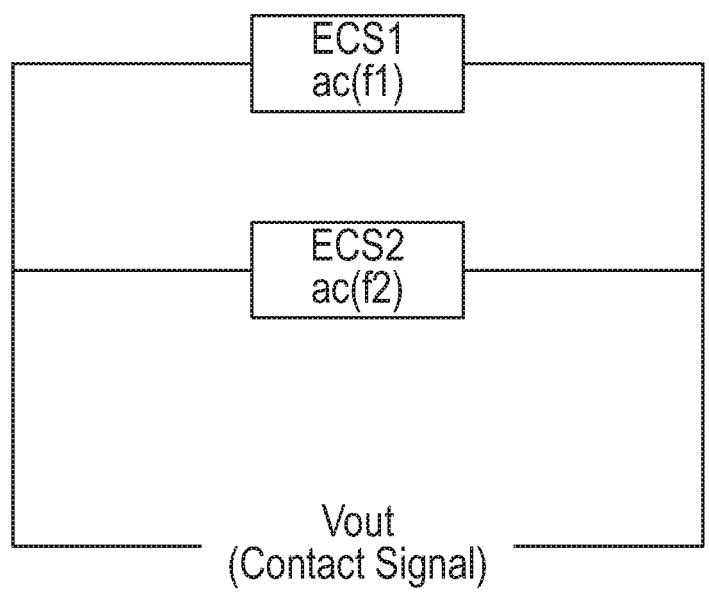
FIG. 8 is a circuit block diagram showing the $V_{out}$ signal from the combined parallel-connected ECS1 and ECS2 sensors when power to the reader and writer heaters is being dithered at the respective f1 and f2 frequencies.

FIG. 8 is a circuit block diagram showing the $V_{out}$ signal from the combined ECS1 and ECS2 sensors when power to the reader and writer heaters is being dithered at the respective f1 and f2 frequencies.

The operation of embodiments of this invention as described above may be implemented in one or more of the electronic components of the HDD as a set of computer program instructions stored in machine-readable memory and executable by a processor, such as a digital signal processor, or by a controller or dedicated microprocessor. The computer program instructions include instructions for applying power to the TFC heaters, dithering power to the TFC heaters at different frequencies, measuring the $V_{out}$ signal, spectrum analyzing $V_{out}$ to determine signals at f1 and f2 frequencies, determining if the signals at f1 and f2 frequencies have exceeded a predetermined threshold, and recording the TFC heater power values. The processor is configured to read and execute the program instructions. The processor or controller may perform logical and arithmetic operations based on program instructions stored in memory, and/or the functions of the method described above may be performed by hardware.

While the invention has been particularly shown and described with reference to the preferred embodiments, it will be understood by those skilled in the art that various changes in form and detail may be made without departing from the spirit and scope of the invention. For example, while the invention has been described for embodiments with dual independent heaters and dual contact sensors, the invention is fully applicable to a HDD that may have more than two heaters and more than two contact sensors. Accordingly, the disclosed invention is to be considered merely as illustrative and limited in scope only as specified in the appended claims.

What is claimed is:

1. A method for determining slider-disk contact in a magnetic recording disk drive having a rotatable magnetic recording disk, a slider maintained over the surface of the rotating disk, a first thermal fly-height control (TFC1) heater and a first contact sensor on the slider, and a second thermal fly-height control (TFC2) heater and a second contact sensor on the slider, the first and second contact sensors being electrically connected to provide a combined output signal, the method comprising:
   applying power to the TFC1 heater;
   applying power to the TFC2 heater;
   dithering the TFC1 heater power at a first frequency;
   dithering the TFC2 heater power at a second frequency different from said first frequency;
   sensing the combined output signal;
   analyzing the combined output signal to detect a first signal at said first frequency and a second signal at said second frequency;
   comparing the first and second detected signals; and
   determining from said compared detected signals the TFC1 and TFC2 heater power values corresponding to slider-disk contact.

2. The method of claim 1 wherein the disk drive includes a reader and a writer, wherein the TFC1 heater and first contact sensor are associated with the reader and the TFC2 heater and second contact sensor are associated with the writer, and wherein comparing the first and second detected signals further comprises determining which of the reader and writer is closer to the disk.

3. The method of claim 1 further comprising:
   after analyzing the combined output signal, in response to determining that neither the first signal at said first frequency nor the second signal at said second frequency exceeds a predetermined touchdown threshold value, increasing power to one of the TFC1 and TFC2 heaters.

4. The method of claim 3 further comprising:
   determining said predetermined touchdown threshold value by identifying when the slope of the first signal at said first frequency or the slope of the second signal at said second frequency is zero.

5. The method of claim 1 wherein dithering the TFC1 heater power at a first frequency comprises oscillating the TFC1 heater power with a predetermined amplitude and dithering the TFC2 heater power at a second frequency comprises oscillating the TFC2 heater power with a predetermined amplitude.

6. The method of claim 1 wherein each of the contact sensors is a thermal embedded contact sensor (ECS) comprising a metallic strip on the slider.

7. A method for determining touchdown of a slider in contact with a disk in a magnetic recording disk drive having a rotatable magnetic recording disk, a slider maintained over the surface of the rotating disk, a reader on the slider, a first thermal fly-height control (TFC1) heater and a first embedded contact sensor (ECS1) associated with the reader, a writer on the slider, and a second thermal fly-height control (TFC2) heater and a second embedded contact sensor (ECS2) associated with the writer, wherein ECS1 and ECS2 are electrically connected in parallel to provide a combined output signal (Vout), the method comprising:
   applying DC power to the TFC1 heater;
   applying DC power to the TFC2 heater;
   dithering the TFC1 DC power at a first frequency;
   dithering the TFC2 DC power at a second frequency different from said first frequency;
   sensing Vout in response to said TFC1 and TFC2 DC power dithering;
   analyzing Vout to detect a first signal at said first frequency ECS(f1) and a second signal at said second frequency ECS(f2); and
   in response to determining that ECS(f1) or ECS(f2) exceeds a predetermined touchdown threshold value, comparing ECS(f1) and ECS(f2) and determining from said compared signals the TFC1 and TFC2 DC heater power values corresponding to slider touchdown; and
   in response to determining that neither ECS(f1) or ECS(f2) exceeds said predetermined touchdown threshold value,
   increasing DC power to one of the TFC1 and TFC2 heaters.

8. The method of claim 7 further comprising:
   determining said predetermined touchdown threshold value by identifying when the slope of ECS(f1) or the slope of ECS(f2) is zero.

9. The method of claim 7 wherein dithering the TFC1 DC heater power at a first frequency comprises oscillating the TFC1 DC heater power with a predetermined amplitude and dithering the TFC2 DC heater power at a second frequency comprises oscillating the TFC2 DC heater power with a predetermined amplitude.

10. The method of claim 7 wherein each of the contact sensors is a thermal embedded contact sensor (ECS) comprising a metallic strip on the slider.

11. A hard disk drive (HDD) comprising:
a rotatable magnetic recording disk;
a gas-bearing slider maintained over the surface of the disk when the disk is rotating;
a read head on the slider;
a read head thermal fly-height control heater on the slider;
a read head contact sensor on the slider;
a write head on the slider;
a write head thermal fly-height control heater on the slider;
a write head contact sensor on the slider and electrically coupled with the read head contact sensor to provide a combined sensor output signal;
machine-readable memory containing a program of instructions; and
a digital processor capable of reading and executing the program of instructions, the processor being configured to control DC power to the fly-height control heaters, oscillate DC power to the fly-height control heaters at different frequencies, detect the combined sensor output signal, analyze the combined sensor output signal to detect first and second signals at different frequencies, and identify when one of said first and second detected signals exceeds a predetermined threshold value.

12. The HDD of claim 11 wherein the processor is further configured to identify when one of said first and second detected signals exceeds a predetermined threshold value by determining when the slope of one of said first and second detected signals is zero.

13. The HDD of claim 11 wherein the processor further is configured to oscillate DC power by oscillating DC power to the read head heater at a first frequency with a predetermined amplitude and oscillating DC power to the write head heater at a second frequency with a predetermined amplitude.

14. The HDD of claim 11 wherein each of the contact sensors is a thermal embedded contact sensor (ECS) comprising a metallic strip on the slider.

* * * * *